United States Patent [19]

Knecht

[11] 4,226,755
[45] Oct. 7, 1980

[54] TRIMELLITIC ACID ESTER AND ITS USE IN A PROTECTIVE LACQUER BASED ON EPOXIDE RESIN

[75] Inventor: Eduard Knecht, Basel, Switzerland

[73] Assignee: Ciba-Geigy Corporation, Ardsley, N.Y.

[21] Appl. No.: 968,898

[22] Filed: Dec. 13, 1978

[30] Foreign Application Priority Data

Dec. 23, 1977 [CH] Switzerland ............... 15959/77

[51] Int. Cl.$^2$ ............................................. C08G 59/42
[52] U.S. Cl. ..................... 260/31.4 EP; 260/32.8 EP; 427/239; 528/110; 528/112; 528/296
[58] Field of Search ............ 528/110, 112, 296; 260/31.4 EP, 32.8 EP

[56] References Cited

U.S. PATENT DOCUMENTS

| | | | |
|---|---|---|---|
| 3,183,248 | 5/1965 | Hirsch et al. | 260/346.3 |
| 3,269,975 | 8/1966 | Lee | 260/37 EP |
| 3,397,254 | 8/1968 | Wynstra et al. | 260/835 |
| 3,639,345 | 2/1972 | Whittemore et al. | 260/47 EA |
| 4,024,111 | 5/1977 | Thomas et al. | 260/75 T |
| 4,092,295 | 5/1978 | Takamoru et al. | 260/47 EA |

OTHER PUBLICATIONS

Shell, "Epoxy Resin Coating Composition and Process", Chem. Abstracts 61, 8524d (1964).

*Primary Examiner*—Earl A. Nielsen
*Attorney, Agent, or Firm*—Joseph F. DiPrima; Harry Falber

[57] ABSTRACT

The invention relates to a trimellitic anhydride ester mixture which is suitable for lacquers and which is obtained by heating trimellitic anhydride together with a diol, in the molar ratio of 1:1 to 2:1, for at least 4 hours at 190° to 250° C., at an external pressure of 5 or 30 Torr for at least part of this time, and in the absence of a catalyst.

The mixture is used as curing agent for the epoxide resin in a laquer containing epoxide resin and optionally pigments. The lacquer is used for the inside coating of tins (cans) for foodstuffs.

8 Claims, No Drawings

TRIMELLITIC ACID ESTER AND ITS USE IN A PROTECTIVE LACQUER BASED ON EPOXIDE RESIN

Clear lacquer systems which can be used for producing coatings in tins (cans) for foodstuffs and in similar packing materials are already known. They contain phenolformaldehyde resins in combination with epoxide resins based on bisphenol A, or terephthalate copolyesters in combination with malamine or benzoguanine resins. The coatings produced therewith leave much to be desired with respect to mechanical deformability, freedom from odour and taste, resistance to acids, and stability to sterilisation. These properties however are in part desired and in part essential for protective lacquers which are used for coating the inside walls of metal containers, such as tins and tubes, which are to contain foodstuffs and drinks producing in most cases an acid reaction, and also chemicals having an acid reaction.

It has now been found that it is possible to obtain firmly-adhering and highly elastic protective coatings which are very resistant to organic acids, which furthermore are free from odour and taste, and which also possess good deformability and good stability to sterilisation (2 hours, 120° C., water or 2% acetic acid), by using lacquers containing, in addition to epoxide resin and optionally pigments, trimellitic anhydride partially esterified with a diol.

The use of partially esterified trimellitic anhydride together with epoxide resin in a lacquer for producing coatings has already been described in the American Pat. No. 3,183,248. The esters mentioned therein are obtained by reaction of trimellitic anhydride with a diol diacetate, and in this manner it is possible to prevent the breaking up of the anhydride groups. Apart from the fact however that this process is complicated and costly, the products obtained by it are different from those of the present invention, which are obtained by reaction of trimellitic anhydride with a diol.

Further trimellitic anhydride/diol condensation products are described in the British Pat. Nos. 963,557, 1,318,926 and 1,019,568. These products are used as components in powder lacquers and do not therefore need to be soluble in organic solvents. They are mixtures of various esters having constituents which are more or less insoluble in organic solvents, and which render them unsuitable for application in lacquers containing solvents.

The present invention relates therefore to a trimellitic anhydride ester mixture suitable for lacquers, which mixture is obtained by heating trimellitic anhydride and at least one diol, in the molar ratio of 1:1 to 2:1, for at least 4 hours at 190°–250° C., preferably 190°–225° C., at an external pressure of 5–30 Torr for at least part of this time, and in the absence of a catalyst.

The preferred molar ratio of trimellitic anhydride to diol is 2:1.25. Up to 20 percent by weight of trimellitic anhydride can be replaced by another organic acid anhydride or by an organic dicarboxylic acid, for example by 15% of adipic acid or sebacic acid. The diols used are for example neopentyl glycol, 1,6-hexylene glycol, 1,3-propylene glycol, polyether diols such as ethylene oxide addition products of glycol, preferably ethylene glycol, or mixtures of two or more such diols.

The procedure in general comprises adding dropwise to the practically clear trimellitic anhydride melt, at a temperature of between 185° C. and 190° C., the diol(s), and slowly increasing the temperature, for example to 200°–215° C., as water is being continuously distilled off, and simultaneously, at least however in the second half of the period, reducing the external pressure to 20–25 Torr. In the course of this condensation reaction, it is possible to establish, by taking samples and determining the acid equivalents, that the anhydride content of the forming ester is increasing and the carboxylic-acid-group content falling. For example, 1664 g of trimellitic anhydride was reacted in this manner with 336 g of glycol and the following characteristic values were obtained:

| Sample taken | Anhydride/equivalent/kg | Acid equivalent/kg |
| --- | --- | --- |
| after completed addition of glycol | 0.61 | 7.03 |
| after 1 hour (195–200° C.) | 1.25 | 5.75 |
| after 2 hours (200–215° C.) | 2.65 | 2.95 |
| after 3 hours 215–220° C.) | 2.93 | 2.93 |
| after 4 hours (about 220° C.) | 3.20 | 1.85 |

The invention relates also to the use of this ester mixture as curing agent for epoxide resins in a lacquer based on epoxide resin. The lacquer can additionally contain substances and pigments customarily used for lacquers. Customary substances which may be mentioned are levelling agents such as acrylic polymers, silicone and fluorinated hydrocarbons, also curing accelerators, such as tin octoate, and physiologically safe soluble dyes. Pigments that may be mentioned are inorganic pigments such as titanium dioxide and iron oxides.

Since the lacquer is used in particular for the inside lacquering of tins containing foodstuffs, the absence of a catalyst in the production of the ester mixture is a favourable factor because catalysts customarily used, such as dibutyl tin dilaurate, remain behind in the protective layer and are undesirable there.

Epoxide resins which can be used are the resins soluble in organic solvents. Epoxide resins based on bisphenol A having an epoxide content of 1–2, preferably of 1–1.5, equivalents/kg are preferred. In addition to resins of this kind, it is also possible to concomitantly use epoxide resins having a higher or lower epoxide content.

Suitable organic solvents are the solvents which are commonly used for lacquers and which are not reactive with anhydride groups, particularly polar solvents, such as esters, for example 1-ethoxy-2-acetoxyethane and 1-methoxy-2-acetoxyethane, or ketones, such as methylisobutyl ketone, cyclohexanone, and so forth.

In addition to being used for the internal coating of metal containers, the said lacquer can also be used as a coil coating. Suitable metal sheet material is tin plate and black sheet, tin-free steel and aluminium sheeting. The metal sheet material can be pretreated, for example phosphated or passivated.

EXAMPLE 1

384 g (2.0 mols) of trimellitic anhydride is melted in a reaction vessel for 45 minutes at 180° C., and 77.5 g (1.25 mols) of ethylene glycol is then added dropwise at the same temperature during 45 minutes. The mixture is heated to 220° C., and at the same time the external pressure is lowered to 15 Torr. In the course of 4 hours, 29.5 g of water is subsequently distilled off. After cooling, the reaction product remaining gives a melting point of about 88° C., an acid number of 460, and 3.2 anhydride-group equivalents per kg.

With the use of this trimellitic anhydride ester, two lacquers (A and B) are produced. The following epoxide resins are used for the purpose:

epoxide resin
   (a): based on bisphenol A, epoxide content:
      1 equivalent/kg (molecular weight: 2000);

epoxide resin
   (b): based on bisphenol A, epoxide content:
      1.3 equivalents/kg (molecular weight: 1500);

epoxide resin
   (c): based on bisphenol A, epoxide content:
      0.25 equivalent/kg (molecular weight: 8000).

| | A | B |
|---|---|---|
| Lacquer composition (parts by weight) | | |
| epoxide resin a | 1000 | — |
| epoxide resin b | — | 750 |
| epoxide resin c | — | 350 |
| trimellitic anhydride glycol ester | 122 | 135 |
| levelling agent "ACRONAL 4F" (20% solution) | 28 | 30 |
| titanium dioxide | — | 827 |
| ethylene glycol acetate | 1106 | 2044 |
| lacquer solutions (50% solid substance) | 2256 | 4136 |
| Properties of the lacquer coating (after curing at 205° C. for 10 minutes) | | |
| film thickness (microns) | 10–12 | 10–12 |
| hardness (seconds, according to Persoz) | 340 | 320 |
| lustre (<) 60° C., Gardner | | >95 |
| impact resistance test (cm/kg) | >160 | >160 |
| stability to sterilization in $H_2O$ (60 minutes at 120° C.) | unchanged | unchanged |
| in 2% acetic acid, 6 hours at 98° C. | unchanged | unchanged |
| in 5% acetic acid/2% tartaric acid, 4 hours at 98° C. | unchanged | unchanged |

Comparative Example

The trimellitic anhydride glycol ester according to Example 1 (=Ester 1) is compared in the following Table with an ester which has been produced according to Example 1 of the U.S. Pat. No. 3,183,248 (=Ester V).

| Property | Ester 1 | Ester V |
|---|---|---|
| acid number | 463 | 527 |
| anhydride groups/kg | 3.2 | 3.7 |
| free carboxyl groups | 1.85 | 2.0 |
| solubility in dist. $H_2O$ | — | + |
| ethyl glycol acetate | + | + |
| methyl ethyl ketone | ± | + |
| methyl isobutyl ketone | ± | + |

+ = completely soluble
± = partially soluble
− = insoluble

The comparison ester (Ester V) is processed under A in Example 1 with the epoxide resin a and the other constituents mentioned into the form of a lacquer. The clear stoving lacquer is sprayed onto metal sheet. After 10 minutes at 190° C. there exists a film having a thickness of 10–12 microns. In contrast to the film of lacquer A, which has a very good unchanged stability to sterilisation (distilled water for 60 minutes at 120° C.), the stability to sterilisation of the film produced from ester V is low: the film displays severe blushing. The adhesion too of the comparison film is very much inferior.

EXAMPLE 2

768 g (4.0 mols) of trimellitic anhydride is melted in a reaction vessel for about 90 minutes at 180°–190° C. During a further 90 minutes, 296 g (2.5 mols) of 1,6-hexanediol is added in 4 portions each of 74 g, in the course of which the temperature is raised to 210° C. and the pressure is reduced to about 15 Torr. The temperature is raised during a further 3 hours to 220° C., in which time about 38.5 g of water is collected as distillate.

The residue has a melting range of about 55°–60° C. (according to Kofler), an acid number of 378, and 1.6 anhydride groups per kg. This curing agent for epoxide resins is readily soluble in esters, particularly in ethyl glycol acetate. It can be processed, as in Example 1, with epoxide resins, and so forth, into protective lacquers for the inside of tins. These lacquers produce films which withstand a high degree of deformation, and which have good stability to water and to organic acids.

EXAMPLE 3

768 g (4 mols) of trimellitic anhydride, 124 g (2 mols) of ethylene glycol and 38 g (0.5 mol) of propylene glycol are allowed to react together according to the procedure of Example 2.

With the solid curing agent obtained, it is possible to produce in ethyl glycol acetate clear solutions which have a content of curing agent of over 50 percent by weight, and which are stable without any tendency towards crystallisation.

In combination with bisphenol A epoxide resins, there are obtained lacquers which have properties identical to those described in Example 1.

I claim:

1. A lacquer which contains: (1) an epoxide resin; (2) a trimellitic anhydride ester mixture which is obtained by heating trimellitic anhydride with at least one diol, in a molar ratio of 2:1.25, for at least 4 hours at 190°–250° C., at an external pressure of 5–30 torr for at least part of this time and in the absence of catalyst; and (3) a solvent.

2. A lacquer according to claim 1, wherein up to 20 percent by weight of the trimellitic anhydride is replaced by another organic acid anhydride or by an organic dicarboxylic acid.

3. A lacquer according to claim 1 or 2, wherein trimellitic anhydride is heated with a diol at a temperature of 190°–225° C.

4. A lacquer according to claim 1, wherein the diol used is ethylene glycol.

5. A lacquer according to claim 1, which additionally contains an ester or a ketone as the solvent.

6. A lacquer according to claim 5, which contains 1-ethoxy-2-acetoxyethane or 1-methoxy-2-acetoxyethane as the solvent.

7. A lacquer according to claim 1, which additionally contains titanium dioxide as pigment.

8. A lacquer according to claim 1, which contains an epoxide resin based on bisphenol A having an epoxide equivalent of 1 to 1.5.

* * * * *